US007785519B2

(12) United States Patent
Pacchiana et al.

(10) Patent No.: US 7,785,519 B2
(45) Date of Patent: Aug. 31, 2010

(54) MOLD AND PROCEDURE FOR THE MANUFACTURE OF A BRAKING BAND OF COMPOSITE MATERIAL, WITH VENTILATION DUCTS

(75) Inventors: Giovanni Paolo Pacchiana, Bergamo (IT); Ralf Siegfried Goller, Bergamo (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 584 days.

(21) Appl. No.: 10/484,911

(22) PCT Filed: Jul. 27, 2001

(86) PCT No.: PCT/IT01/00412

§ 371 (c)(1),
(2), (4) Date: Jan. 27, 2004

(87) PCT Pub. No.: WO03/012311

PCT Pub. Date: Feb. 13, 2003

(65) Prior Publication Data

US 2004/0207108 A1    Oct. 21, 2004

(51) Int. Cl.
*B29C 43/36* (2006.01)
(52) U.S. Cl. ............... 264/319; 264/320; 264/154; 264/155; 264/163; 425/577; 425/468; 425/523; 425/414
(58) Field of Classification Search ........... 264/319
See application file for complete search history.

(56) References Cited

U.S. PATENT DOCUMENTS

| | | | | |
|---|---|---|---|---|
| 4,108,956 A | * | 8/1978 | Lee | 264/161 |
| 4,778,439 A | * | 10/1988 | Alexander | 493/169 |
| 5,074,352 A | * | 12/1991 | Suzuki | 164/97 |
| 5,204,127 A | * | 4/1993 | Prusha | 425/544 |
| 5,275,548 A | * | 1/1994 | Tibiletti | 425/129.1 |
| 5,690,884 A | * | 11/1997 | Cerny | 264/328.1 |
| 5,725,819 A | * | 3/1998 | Onishi et al. | 264/161 |
| 6,216,829 B1 | * | 4/2001 | Daudi | 188/218 XL |
| 6,673,402 B2 | * | 1/2004 | Wildenrotter et al. | 428/34.5 |

FOREIGN PATENT DOCUMENTS

DE    198 30 669 A1    1/2000

(Continued)

OTHER PUBLICATIONS

Rosato, Dominick V., Donald V. Rosato, Marlene G. Rosato. Injection Molding Handbook (3rd ed.). Boston: Kluwer Academic Publishers. 2000. p. 334.*
International Search Report dated Mar. 21, 2002, for Application No. PCT/IT01/00412.

*Primary Examiner*—Monica A Huson
(74) *Attorney, Agent, or Firm*—Hogan Lovells US LLP

(57) ABSTRACT

A mould for moulding braking bands with ventilation ducts with the use of composite material and, in particular, of C/SiC ceramic material, comprises two half-moulds with respective impression surfaces which face one another and lie perpendicular to an axis of symmetry and which, together with outer and inner cylindrical walls, define a moulding cavity in the shape of the braking band to be moulded. The mould also has pin elements which have the shape of the ventilation ducts and which can be transferred by secondary actuating means from a rest position to a working position and vice versa, the pin elements being outside the moulding cavity in the rest position and the pin elements being inserted in the moulding cavity in the working position.

49 Claims, 7 Drawing Sheets

FOREIGN PATENT DOCUMENTS

| | | |
|---|---|---|
| DE | 198 34 571 A1 | 2/2000 |
| JP | 57 140929 A | 8/1982 |
| JP | 58 049545 A | 3/1983 |
| JP | 02 236203 | 9/1990 |
| JP | 09 279270 A | 10/1997 |
| JP | 2000317609 A | 11/2000 |

* cited by examiner

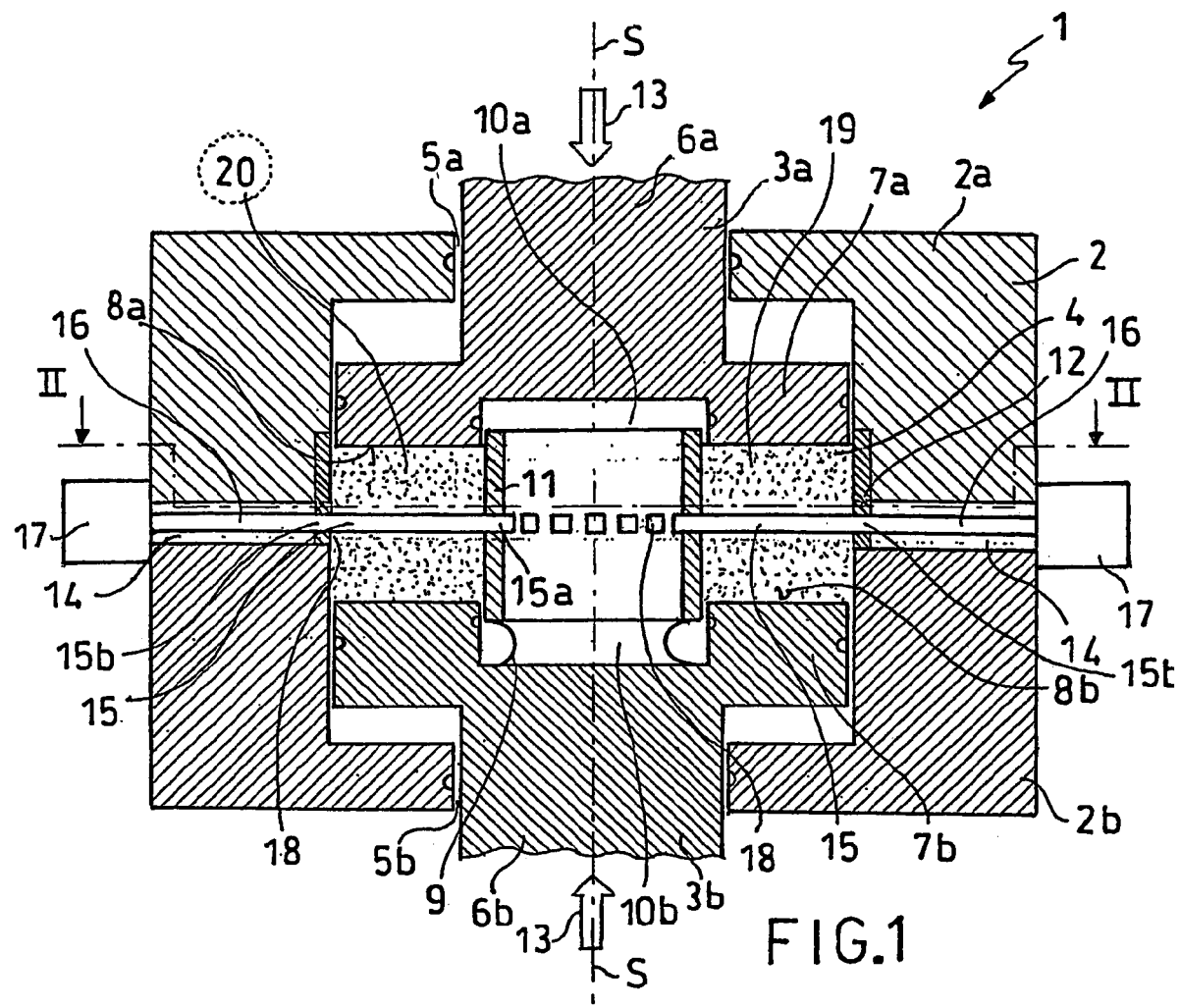
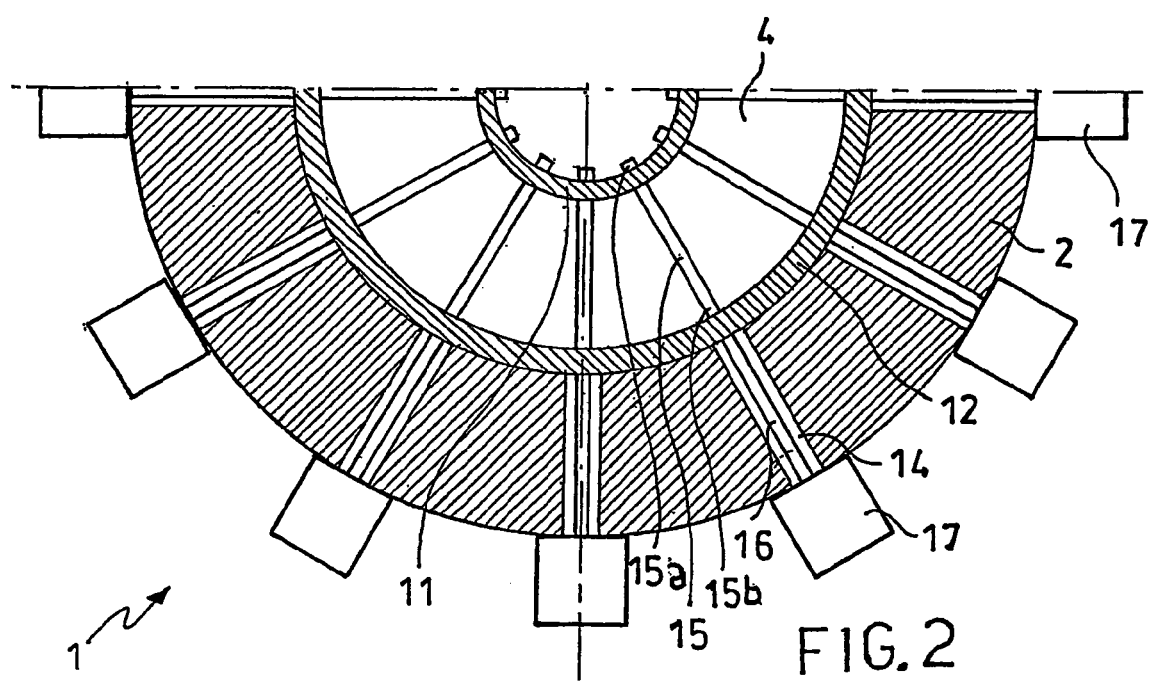

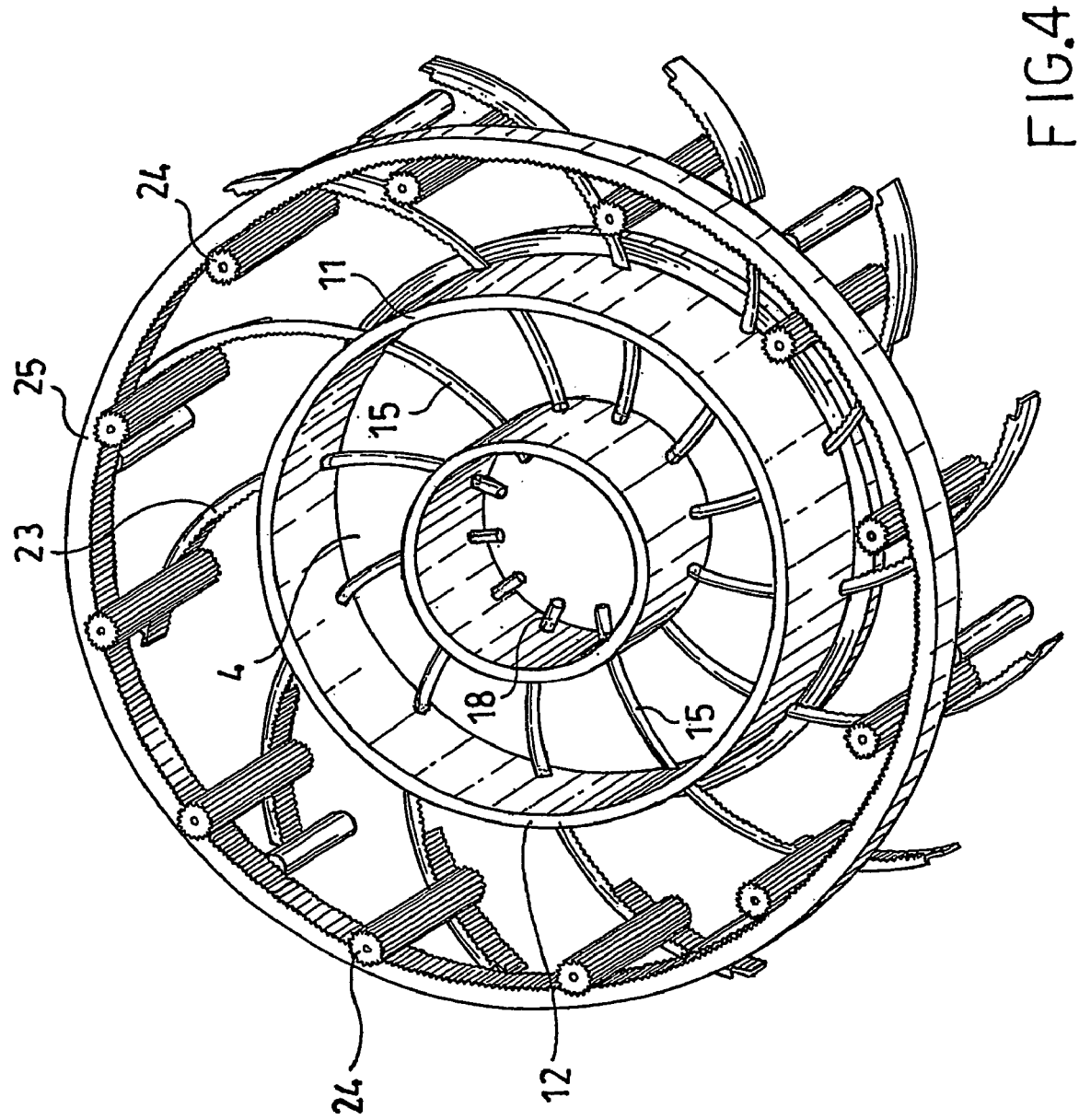

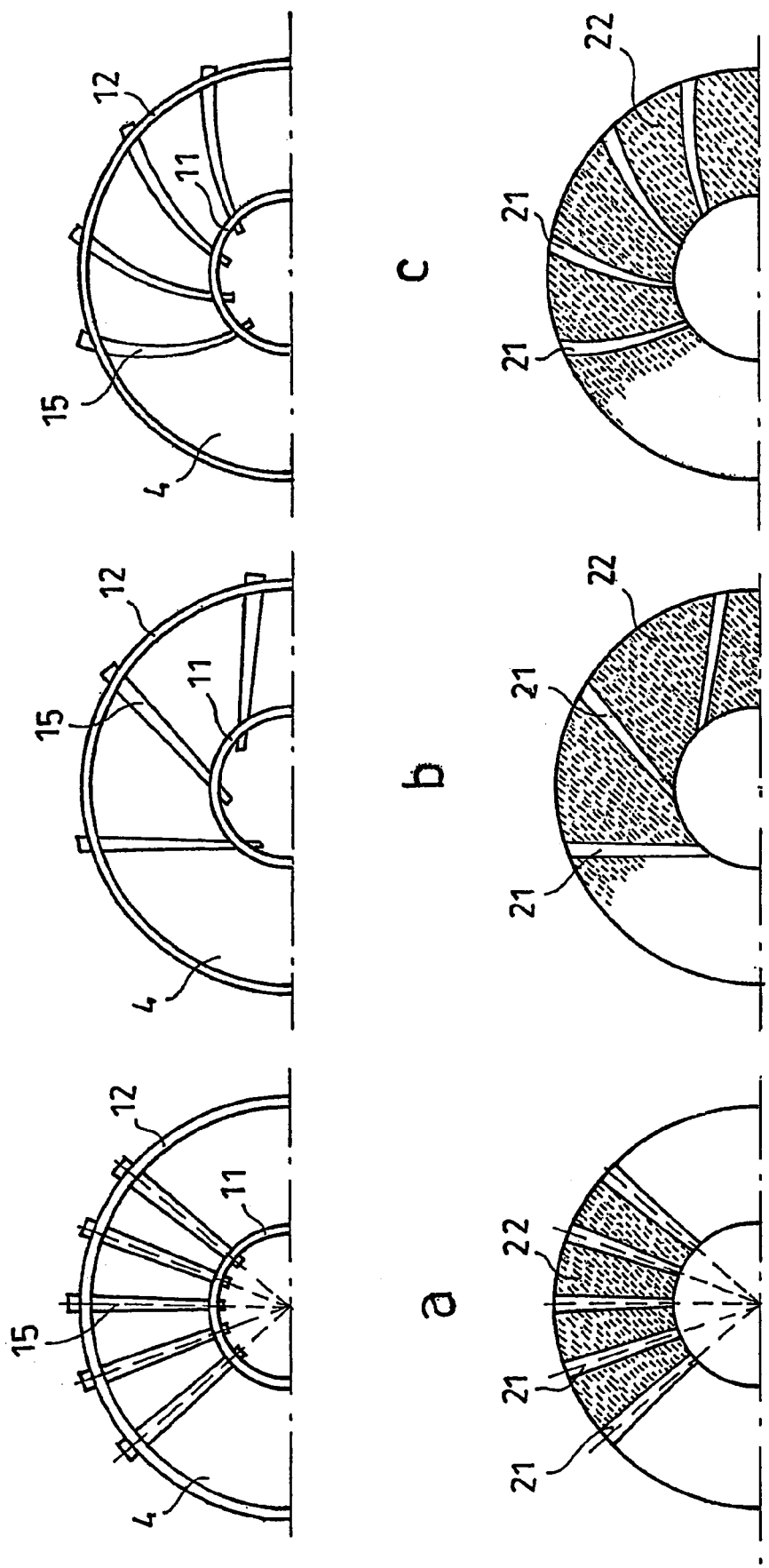
FIG. 5.1

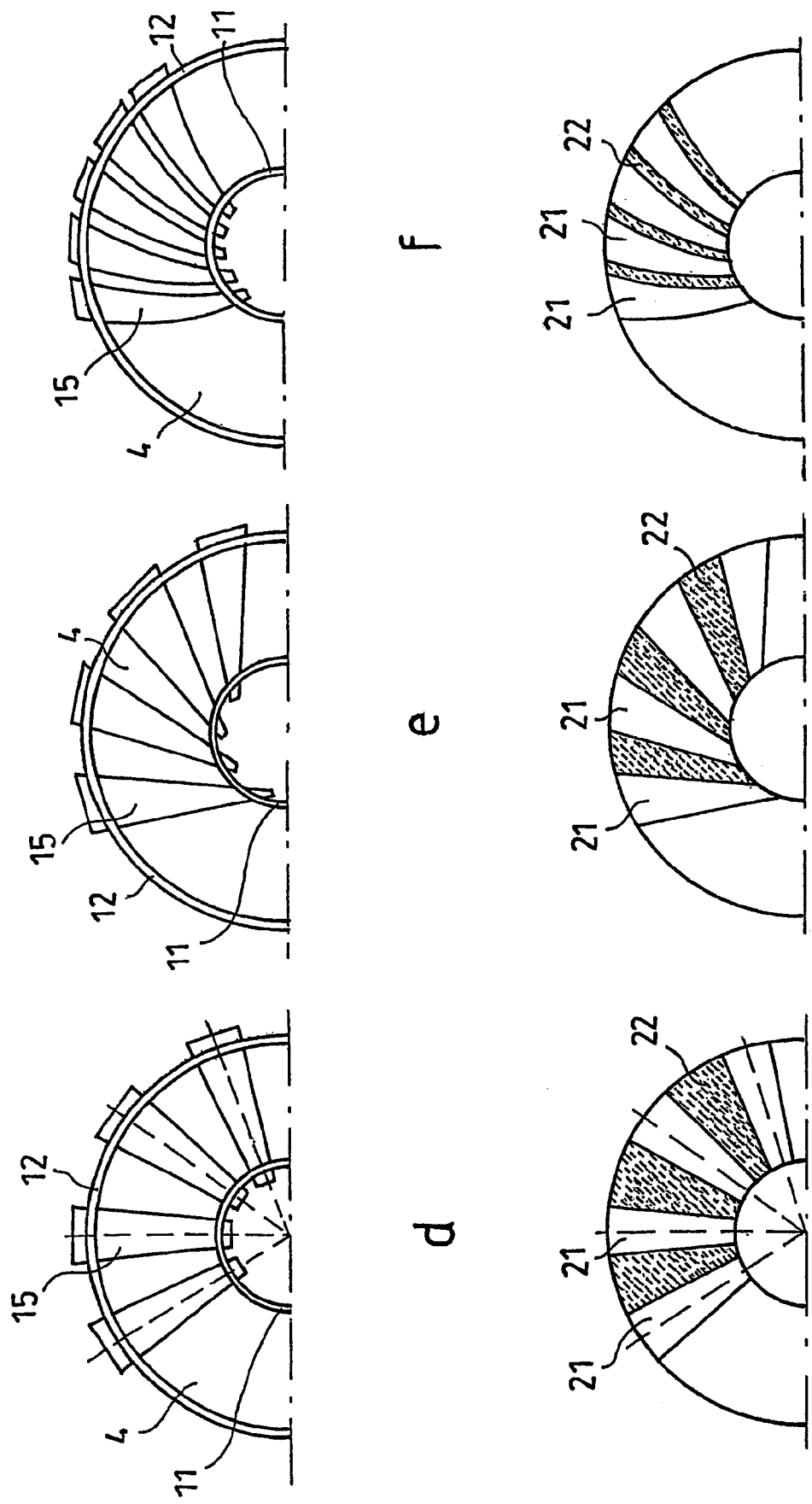
FIG.5.2

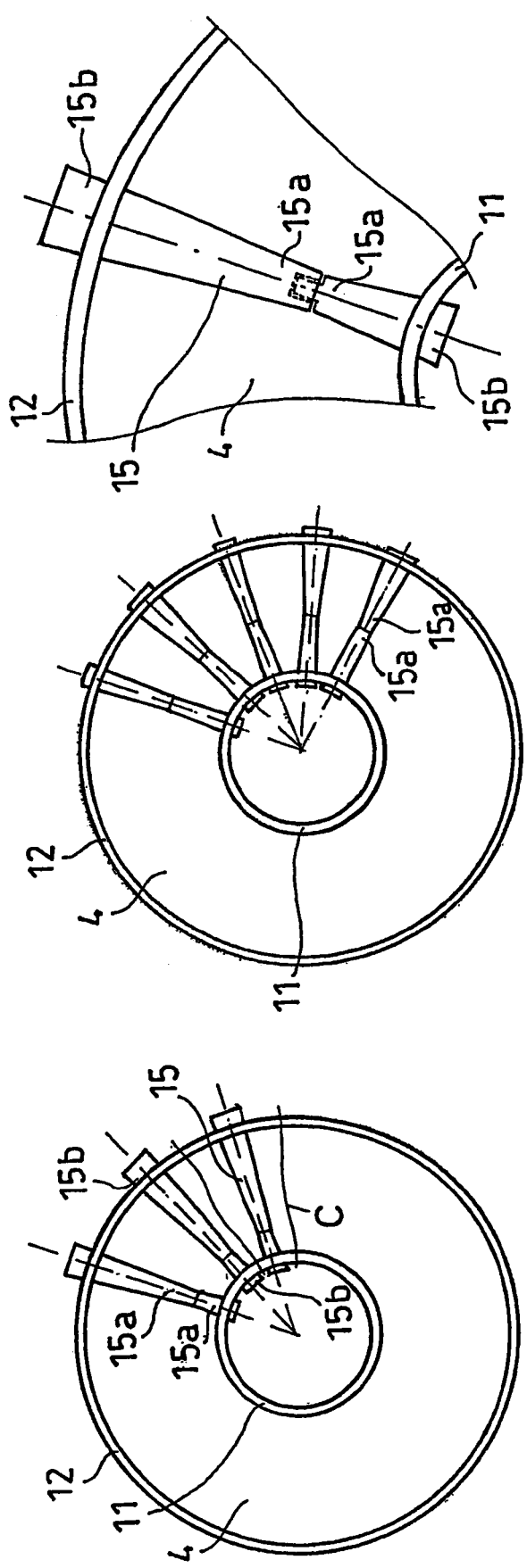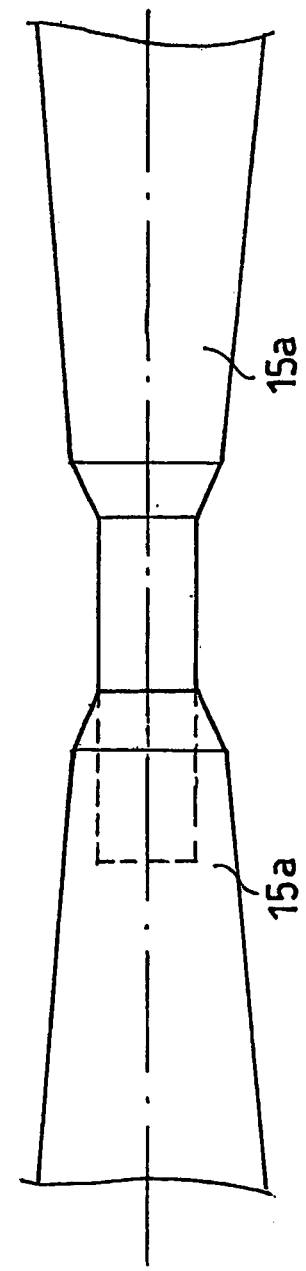
FIG.7

MOLD AND PROCEDURE FOR THE MANUFACTURE OF A BRAKING BAND OF COMPOSITE MATERIAL, WITH VENTILATION DUCTS

FIELD OF THE INVENTION

A subject of the present invention is a mould and a method for the manufacture of a self-ventilated braking band of composite material and, in particular, of ceramic material of the C/SiC type, for a disk-brake disk.

BACKGROUND OF THE INVENTION

Known methods for the manufacture of self-ventilating braking bands of composite material can be divided generally into three groups.

The first group of known methods provides for the moulding of the braking band as a solid body similar to that of a non-ventilated brake disk and the subsequent formation of radial and non-radial holes lying in the central plane of the thickness of the band and constituting the ventilation ducts.

The second group of methods for the production of self-ventilated braking bands of composite material provides, in a first step, for the separate moulding of two reflectively symmetrical portions of the braking band, which have channels in their respective surfaces that face one another. The two portions are then brought into contact and glued together to form the finished band in which the channels of each of the portions together define the ventilation ducts.

In the third group of known methods, the ventilation ducts are produced by means of a core of composite material which is inserted in the mould, between two layers of the material for forming the band, and which already has in its interior the cavities which will constitute the ventilation ducts. Since it is made of material identical or at least similar to that of the band, the core becomes closely connected to the composite material of the braking band, forming a composite "sandwich" structure therewith. The core itself is formed by two half-cores arranged facing one another and glued together in a similar manner to the braking band of the above-mentioned second production method.

However, the above-mentioned methods of the prior art have some problems and disadvantages connected mainly with technological difficulties.

In the first method, the formation of the holes in the thickness of the braking bands is without doubt very expensive and difficult because of the hardness of the materials used. Moreover, this machining inside the braking band is much less controllable than the machining of the outer surfaces of the band. During this machining, it is consequently not possible to exclude the formation of sharp edges or even cracks, which cannot be tolerated in view of the intrinsic fragility of the materials used.

The second method, on the other hand, has the great disadvantage of the need to join together two portions of a braking band which, since they are moulded separately, may not correspond and may therefore fit together unevenly. This could give rise to a product in which dangerous detachment of these two portions can easily occur.

With regard to the third group of known methods, this requires the provision of two moulds for the moulding of the respective half-cores, as well as a third mould for the moulding of the braking band. Moreover, in order to achieve satisfactory results, the core produced by means of the two half-cores has to be positioned very accurately inside the mould for the braking band. All of this requires quite complex technical solutions as well as manual intervention in every moulding cycle.

The above-mentioned technological difficulties, as well as the resulting costs, also reduce the competitiveness of self-ventilated brake disks made of composite material, in comparison with solid disks.

There is consequently a need to provide tools and a method for the production of self-ventilated braking bands of composite material which are particularly simple and which ensure a product of optimal quality, as well as to provide braking bands produced by means of these tools and this method.

The proposed aim of the present invention is therefore to devise a mould for the production of self-ventilated braking bands of composite material such as to satisfy the above-mentioned needs and at the same time to overcome the disadvantages mentioned with reference to the prior art.

SUMMARY OF THE INVENTION

The above-described aim is achieved by means of a mould for braking bands of composite material, with ventilation ducts, the mould comprising two half-moulds, each half-mould having an impression surface, the impression surfaces facing one another, lying substantially perpendicular to an axis of symmetry, and defining, together with containment means, a moulding cavity having the shape of the braking band, at least one of the half-moulds being movable by means of respective principal actuating means along the axis of symmetry towards the other half-mould, respectively, wherein the mould comprises one or more pin elements which can form the ventilation ducts and which can be transferred by secondary actuating means from a rest position to a working position and from the working position to the rest position, respectively, in which the pin elements do not interfere with the moulding cavity in the rest position and the pin elements intersect the moulding cavity in the working position.

BRIEF DESCRIPTION OF THE DRAWINGS

For a better understanding of the invention, there follows a description of a non-limiting embodiment thereof, illustrated in the appended drawings, in which:

FIG. 1 shows a mould according to the invention, in cross-section,

FIG. 2 shows the mould of FIG. 1, sectioned on the line II-II,

FIG. 4 is a perspective view of a further embodiment of the present invention,

FIGS. 5.1 and 5.2 show possible configurations of the mould according to the invention, as well as the ventilation-duct shapes thus produced, FIG. 7 is a plan view showing possible configurations of the pin elements inside the moulding cavity.

DETAILED DESCRIPTION OF THE PREFERRED EMBODIMENTS OF THE INVENTION

Figure 3:
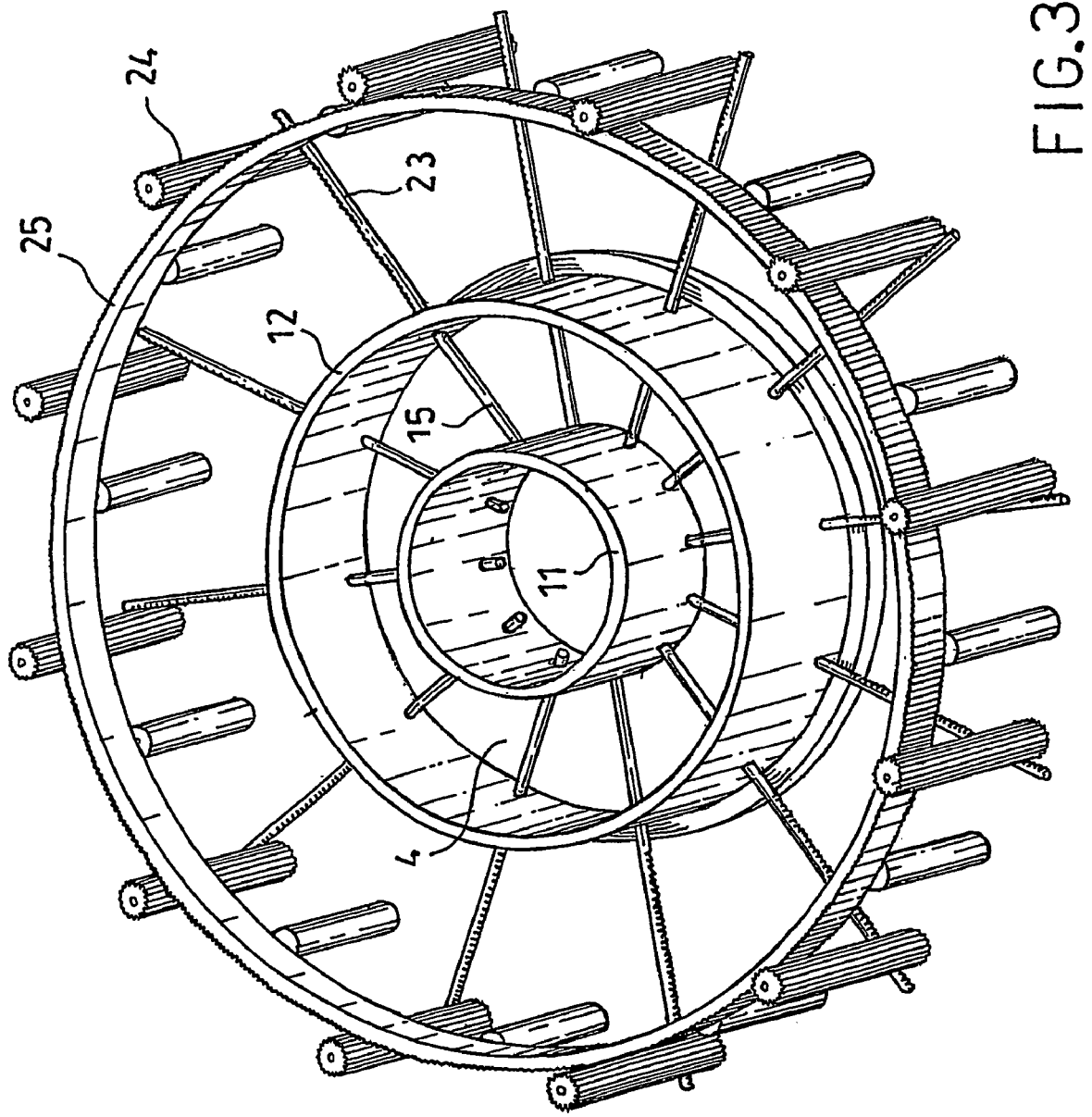
FIG. 3 is a perspective view of an embodiment of the present invention.

With reference to FIG. 1, a mould for moulding self-ventilated braking bands of composite material is generally indicated 1. The mould 1 comprises a housing 2, an upper half-mould 3a, and a lower half-mould 3b. The housing 2 is constituted by a fixed lower portion 2b as well as a movable upper portion 2a which, in operative conditions, are coupled so as to define a moulding cavity 4 within them. The moulding cavity 4 has a substantially cylindrical shape which is symmetrical with respect to an axis of symmetry s. Both of the upper and lower portions 2a, 2b of the housing 2 have respective circular openings 5a and 5b which are also centred relative to the axis of symmetry s.

The upper half-mould 3a is constituted by an operating rod 6a and by a plate 7a, the diameter of the operating rod 6a being slightly less than the diameter of the circular opening 5a in the upper portion 2a of the housing 2 and the diameter of the plate 7a being slightly less than the inside diameter of the moulding cavity 4. The upper half-mould 3a is mounted in the upper portion 2a of the housing 2 so as to be slidable along the axis of symmetry s and in a manner such as to form a seal against the inner surface of the circular opening 5a and against the inner surface of the moulding cavity 4.

The lower half-mould 3b also comprises an operating rod 6b and a plate 7b, the outside diameter of the operating rod 6b being slightly less than the diameter of the circular opening 5b in the lower portion 2b of the housing 2 and the diameter of the plate 7b being slightly less than the inside diameter of the moulding cavity 4. The lower half-mould 3b is mounted inside the lower portion 2b of the housing 2 so as to be slidable along the axis of symmetry s and in a manner such as to form a seal against the inner surface of the circular opening 5b and against the inner surface of the moulding cavity 4.

An upper impression surface 8a is formed on the lower side of the plate 7a and faces a lower impression surface 8b formed in the upper side of the plate 7b. The upper and lower impression surfaces 8a and 8b have a substantially circular ring-like shape extending about the axis of symmetry s. The upper and lower impression surfaces 8a, 8b are defined internally by respective substantially cylindrical recesses 10a, and 10b, which are symmetrical with respect to the axis of symmetry s.

The moulding cavity 4 is defined internally and externally by respective inner and outer walls 11 and 12. The inner wall 11 has a substantially cylindrical shape, symmetrical with respect to the axis of symmetry s, and is operatively associated with the lower half-mould 3b. In particular, the inner wall 11 is fitted slidably in the recess 10b, possibly held in position by further support means 9, and projects towards the upper half-mould 3a. The further support means 9 comprise, for example, a spring which can be compressed in the direction of the axis s. Since the two ends of the inner wall 11 have outside diameters slightly less than the inside diameters of the cylindrical recesses 10a and 10b, in operation, they are fitted in the upper and lower cylindrical recesses 10a, 10b, respectively, forming seals against the internal walls thereof. The outer wall 12, which is also substantially cylindrical, has an inside diameter equal to the inside diameter of the moulding cavity 4.

According to one embodiment, the function of the outer cylindrical wall 12 is performed directly by the housing 2 of the mould 1. The housing 2 is concentric with the inner wall 11. Alternatively, the cylindrical outer wall 12 constitutes a separate element which is fitted between the upper portion 2a and the lower portion 2b of the housing 2 of the mould 1.

Principal actuating means 13 are associated with the rod 6a of the upper half-mould 3a and with the rod 6b of the lower half-mould 3b and exert the force necessary to move the upper and lower half-moulds along the axis s and to produce the desired pressure inside the moulding cavity 4. According to one embodiment of the invention, the principal actuating means 13 comprise at least one hydraulic piston/cylinder unit, together with an oleodynamic circuit which is of known type and therefore not described.

Around the edge of the moulding cavity 4, the housing 2 has a series of ducts 14 which lie in a plane substantially perpendicular to the axis of symmetry s and are arranged substantially radially relative thereto. The ducts 14 house pin elements 15 each having a front end 15a facing the moulding cavity 4 and a rear end 15b facing the edge of the mould 1. In the embodiment described herein, the cross-sections of the pin elements have a substantially rectangular shape and are tapered from their rear ends 15b towards their front ends 15a.

The rear end 15b of each pin element 15 is connected, directly or by suitable transmission means 16, to secondary actuating means 17, preferably disposed around the outer edge of the housing 2 of the mould 1. According to one embodiment of the invention, the secondary actuating means 17 comprise hydraulic cylinder/piston units, together with respective oleodynamic circuits.

The secondary actuating means 17, together with optional transmission means 16, can cause the pin elements 15 to slide along predetermined paths through suitable through-holes 18 in the outer and inner cylindrical walls 12 and 11, into the moulding cavity 4.

The through-holes 18 have cross-sections substantially corresponding to those of the portions of the respective pin elements 15 which they surround when the pin elements are inserted in the moulding cavity 4. The outer surfaces of the pin elements 15 thus form a seal against the respective internal surfaces of the through-holes 18 during the moulding of a braking band 20 from composite material.

The operation of the mould 1 for self-ventilated braking bands of composite material, as well as the step of the moulding of the braking bands with the use of the mould 1 according to the invention, will be described below with reference to FIGS. 1 and 2.

At the start of a moulding cycle, the two portions of the mould 1, that is, the upper portion 2a and the lower portion 2b, are spaced apart and the moulding cavity 4 is accessible from the exterior. The pin elements 15 are in a rest position, that is, outside the moulding cavity 4. Under the action of the secondary actuating means 17 and, optionally, by means of transmission means 16, the pin elements 15 slide from the rest position to a working position, that is, they enter the moulding cavity 4 through the through-holes 18 in the outer and inner walls 12 and 11.

In the embodiment shown in FIGS. 1 and 2, the pin elements 15 enter the moulding cavity 4 through the through-holes 18 in the outer cylindrical wall 12 and their front ends 15a are inserted in the through holes 18 in the inner cylindrical wall 11.

In the working position, the portions of the pin elements 15 which are inside the moulding cavity 4 define the shapes of ventilation ducts 21 of the braking band 20 to be moulded.

When the pin elements 15 are in the working position, the moulding cavity 4 is filled with a mixture of material 19 to be moulded. The mixture of material 19 preferably comprises bundles of filaments which are constituted substantially by carbon and which are chopped so as to have lengths of less than 30 mm. These materials are mixed with a binding resin such as, for example polyurethane or, more preferably, a phenolic resin, pitches, and other additives.

After the moulding cavity 4 has been filled with a predetermined quantity of the above-mentioned mixture of material 19 to be moulded, the mould 1 is closed by the leaktight coupling of the two portions, that is, the upper portion 2a and the lower portion 2b of the housing 2.

The step of the moulding of the braking band 20 requires a predetermined pressure, predetermined heating, and means for defining the shape of the band 20.

The principal actuating means 13 act on the upper and lower half-moulds 3a and 3b which move towards one another, exerting on the mixture of material 19 a predetermined pressure suitable for the moulding of the braking band 20. The upper and lower impression surfaces 8a and 8b of the respective half-moulds 3a, 3b, together with the inner and outer walls 11 and 12, define the shape of the braking band 20 to be moulded. Heating means are also provided outside the mould 1, in order to achieve the appropriate temperature conditions for the moulding.

According to one embodiment of the invention, the mould 1 is inserted between two plates of a hydraulic press in which the plates are provided with electrical heating resistors.

According to another embodiment of the invention, the heating means comprise electrical resistors and heat sensors disposed on the outer shell of the mould 1.

During the step of the moulding of the braking band 20 by means of the mould 1 according to the invention, the mixture of material 19 inside the moulding cavity 4 is heated to a temperature of from 80° C. to 180° C., preferably from 100° C. to 150° C. and is subject to a pressure of between 0.1 N/cm$^2$ and 5 N/cm$^2$, preferably between 0.5 N/cm$^2$ and 1.0 N/cm$^2$.

Upon completion of the moulding, the pin elements 15 return from the working position to the rest position under the action of the secondary actuating means 17 and, optionally, by means of interposed transmission means 16. This means that the pin elements 15 are extracted from the semi-finished braking band 20, thus freeing the ventilation ducts 21. This extraction of the pin elements 15 from the semi-finished baking band 20 is facilitated by the shape of their cross-sections which are tapered from the rear ends 15b towards the front ends 15a.

After the mould 1 has been opened by the movement of the upper portion 2a away from the lower portion 2b of the housing, the semi-finished braking band 20 is ejected from the mould 1 by a further travel of the lower half-mould 3b, and the mould 1 in turn is ready to start the next moulding cycle.

The semi-finished braking band 20 is subjected to a first firing in a furnace at a temperature such as to bring about carbonization or pyrolysis of the resin. This firing is performed in a conventional furnace at a temperature which depends substantially on the type of binder used and which is generally within the range of 900° C.-1200° C. The firing is performed in the presence of a stream of inert gas such as nitrogen or argon and with an extra pressure of 10-100 mbar, preferably 20-30 mbar.

During this step of the method, the material of the semi-finished braking band 20 acquires greater porosity which is important for a subsequent firing during which fused silicon infiltrates it.

According to one embodiment of the invention, the method may further comprise a step for the finishing of the surface of the half-finished band 20 coming from the pyrolysis step. This enables any surface deformations of the braking band 20 to be removed by conventional apparatus so as to give it the desired shape.

The finishing step is preferably performed dry, for example, with diamonds, since the semi-finished braking band 20 which, after the first firing, has acquired some porosity, might absorb liquid substances if the finishing were performed wet.

The braking band 20 is then subjected to a second firing in the presence of silicon at a temperature such as to bring about fusion of the loose silicon and its infiltration into the pores of the braking band 20. The fused silicon reacts partially with the carbon of the semi-finished braking band 20, forming silicon carbides which have the effect of improving the cohesion characteristics of the material. The firing (silication) is performed under vacuum, reducing the pressure from 900 mbar to 300 mbar, preferably from 800 mbar to 500 mbar, and at a temperature of between 1400° C. and 1700° C.

Upon completion of the silication step, the braking band 20 is cooled, for example, with argon or, preferably, with nitrogen, so that the residual silicon solidifies in small spheres which are easy to recover.

Upon completion, the self-ventilated braking band 20 may optionally be subjected to further finishing operations, for example, surface finishing, which may be performed dry or wet, in conventional manner.

The mould 1 for moulding self-ventilating braking bands 20 of composite material according to the invention has many advantages.

By virtue of the presence of the pin elements 15, the mould 1 is particularly simple and strong and ensures a product of optimal quality.

By virtue of its cyclic and automated operation, the mould 1 according to the invention is particularly suitable for mass production without requiring manual intervention in every moulding cycle.

The presence of only one mould 1, rather than several moulds for cores and bands, makes production easily repeatable and controllable and thus improves the quality of the final product.

A mould 1 according to the invention enables one complete production stage, that is, the moulding of the cores, to be omitted. The omission of the production of cores and of the respective moulds for moulding them leads to a considerable saving in time and energy.

Moreover, the braking bands 20 produced by the mould 1 according to the invention are not subject to dangerous detachment of the two plates, as occurs when the two plates are joined together.

The finishing of the braking band 20 by machining affects only the outer surfaces, which can easily be checked. This reduces the number of invisible sharp edges or cracks and hence the risk of brittle breakage of the braking band 20 in use.

Naturally, variations and/or additions may be provided for the embodiments described and illustrated above without departing from the scope of the invention.

For example, according to one embodiment of the invention, individual portions of the containment means 11, 12 form a structural unit with the pin elements 15 and are moved together therewith, defining the moulding cavity 4 only when the pin elements 15 are in the working position.

According to the type of ventilation duct desired, in the working position, the pin elements 15 may intersect the moulding cavity 4 at different distances and inclinations both relative to one another and relative to the impression surfaces 8a and 8b.

Advantageously, in the working position, the pin elements lie in a plane substantially perpendicular to the axis of symmetry s and, with further advantage, the pin elements 15 are disposed halfway between the impression surfaces 8a, 8b of the two half-moulds 3a, 3b.

According to a further embodiment of the invention, in the working position, the front ends 15a of at least two of the pin elements 15 meet inside the moulding cavity 4, forming, in the braking band 20, a system of ventilation ducts in which all of the outlets are enlarged in comparison with the inner portions, as shown, for example, in FIGS. 7b and 7c.

A further development of the embodiment just described provides for the front end 15a of a first pin element 15 to have a prismatic, final, tapered portion which is inserted in a respective prismatic cavity formed in the front end 15a of a second pin element 15, in the working position, as shown in FIG. 7a.

In the embodiment shown in FIG. 7d, the prismatic final portion is inserted only partially in the prismatic cavity, forming a ventilation duct with a peripheral projection.

In the rest position, the pin elements 15 are retracted from the moulding cavity 4 and in practice can be "parked" in any position in which they do not obstruct the spaces required for the respective machining steps.

According to the preferred embodiment, in the rest position, the pin elements 15 are arranged at intervals around the outer boundary of the moulding cavity 4 and, in the working position, the pin elements 15 are inserted in the moulding cavity 4, extending from the outer wall 12 to the inner wall 11.

The embodiment of the invention described above provides for the pin elements 15 to be substantially straight and arranged radially relative to the axis of symmetry s, forming straight, substantially radial ventilation ducts 21 in the braking band 20.

An alternative embodiment of the invention provides for a mould 1 in which the pin elements 15 are substantially straight but are inclined to radial directions, with respect to the axis of symmetry s.

According to a further embodiment, the pin elements 15, which lie in a plane perpendicular to the axis of symmetry s, are of a substantially arcuate shape, forming arcuate ventilation ducts 21 in the braking band 20.

FIGS. 5.1 and 5.2 show examples of pin elements 15 inside the moulding cavity 4 for producing ventilation ducts 21 particularly suitable for cooling the braking band 20, and the respective braking bands, which are shown in section. The pin elements 15 shown in FIGS. 5a, 5b and 5c have cross-sections which are tapered slightly from the outer wall 12 towards the inner wall 11 so as to form ventilation ducts 21 with almost uniform cross-sections, but such as to permit a draft angle adequate for easy extraction of the pin elements 15 after moulding.

The pin elements 15 shown in FIG. 5f, on the other hand, have cross-sections which are tapered greatly from the outer wall 12 towards the inner wall 11 so as to form ventilation ducts 21 which are tapered from the outer boundary of the braking band 20 towards its inner boundary, as well as walls 22 of composite material with substantially uniform cross-sections, between the ventilation ducts 21.

In the embodiment of the invention described above, the pin elements 15 have a substantially rectangular shape in cross-section. Naturally, pin elements 15 with cross-sections of any shape which is tapered from the rear end 15b towards the front end 15a may be formed so as in any case to enable the pin element 15 to be extracted from the semi-finished braking band 20.

Figure 6:
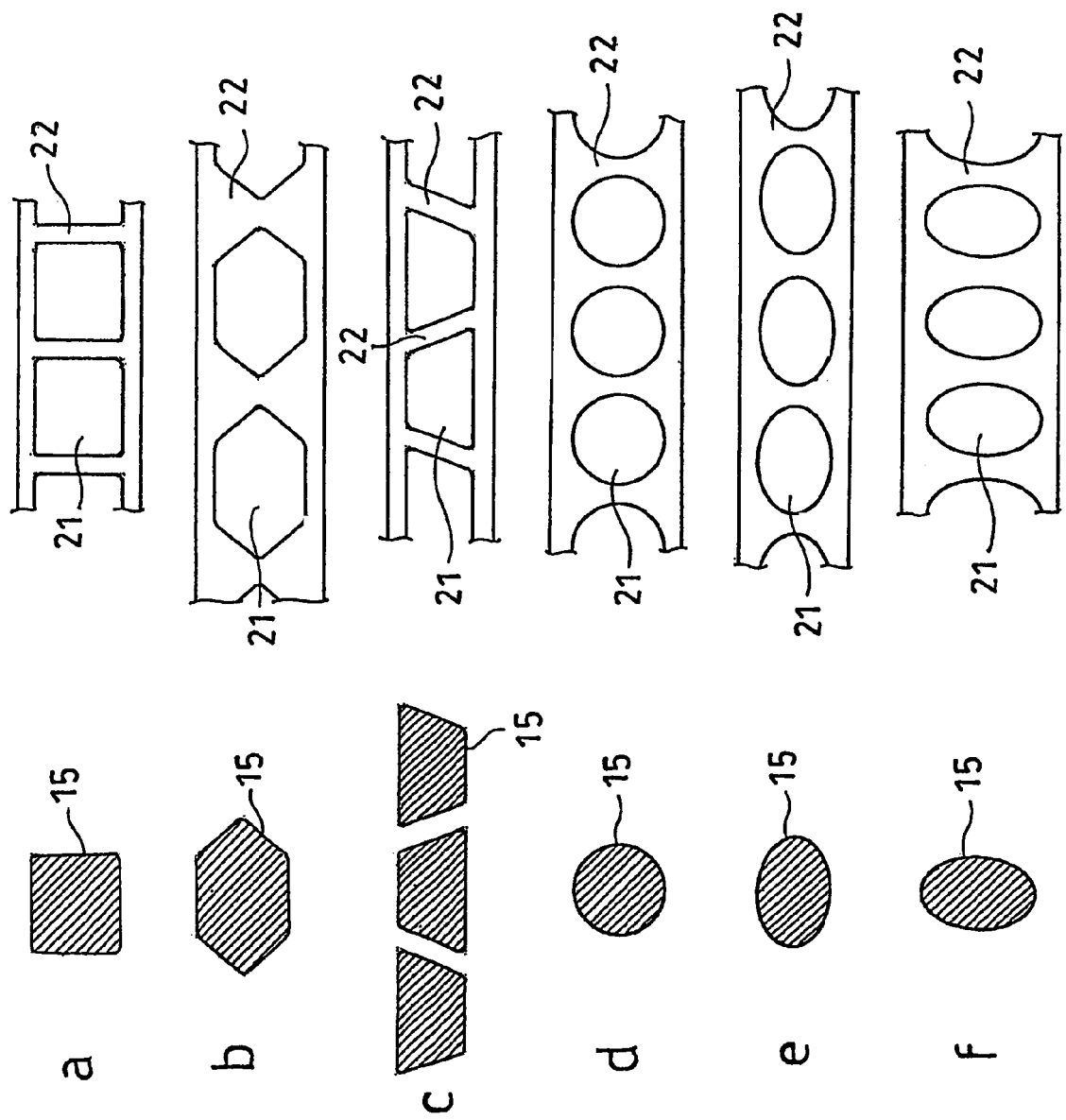
FIG. 6 shows, in cross-section, some preferred shapes of the pin elements according to the invention, as well as of the ventilation ducts thus produced.

Preferred variants of the invention provide for a substantially rectangular, trapezoidal, or polygonal cross-sectional shape of the pin elements 15, in which the cross-section advantageously has two sides which are parallel to one another and to the friction surfaces of the braking band 20, as shown, for example, in FIGS. 6a to 6c. The corners along the outer surfaces of the pin elements 15, and consequently inside the ventilation ducts 21 of the braking band 20, are advantageously rounded.

A further embodiment of the invention provides for the pin elements to have substantially circular or oval cross-sectional shapes as shown, for example, in FIGS. 6d to 6f.

It is also possible to produce a mould 1 having pins 15 which differ from one another in cross-sectional shape, as can be seen, for example, from FIG. 6c, in which the pin elements 15 have substantially trapezoidal cross-sections with the orientation of the larger base alternating between each two successive pin elements 15, so as to produce connecting fins 22 which are inclined alternately in opposite directions.

The principal actuating means 13 may be of any type suitable for bringing about a linear to-and-fro movement of the two half-moulds 3a and 3b. According to one embodiment of the invention, the principal actuating means 13 comprise at least one hydraulic piston/cylinder unit and an oleodynamic circuit. Alternatively, the principal actuating means 13 comprise a linear motor.

Each individual pin element 15 of a mould 1 may have its own secondary actuating means 17, or one or more centralized secondary actuating means 17 may be provided, with suitable transmission means for transferring entire groups of pin elements 15 from the rest position to the working position and vice versa.

The secondary actuating means 17 may comprise one or more hydraulic or pneumatic piston/cylinder units with respective oleodynamic or pneumatic circuits.

According to a further embodiment, shown in FIG. 3, the secondary actuating means comprise geared transmissions. Each pin element 15 has, at its rear end, a rack 23 the teeth of which mesh with a set of teeth of a respective pinion 24. All of the pinions 24 mesh with a peripheral set of teeth on the surface of a drive ring 25.

If the drive ring 25 is rotated, the pin elements 15 enter the moulding cavity 4 until, by virtue of their taper, they come into abutment with the inner walls of the through holes 18 or with suitable abutments and counter-abutments provided on the pin elements 15 and in the housing 2 of the mould 1, respectively. Rotation of the drive ring 25 in the opposite direction brings about extraction of the pin elements 15 from the moulding cavity 4 and hence from the semi-finished braking band 20.

FIG. 4 shows a variant of the above-described mould 1 in which the pin elements have an arcuate shape substantially in the form of an arc of a circle.

The mould 1 for moulding self-ventilated braking bands 20 of composite material according to the invention may be made of any metallic material suitable for mechanical tooling of this type. The preferred embodiment provides for a mould 1 made of aluminium or aluminium alloy with pin elements 15 of aluminium or aluminium alloy.

In order to achieve well-controlled thermal conditions, the mould 1 according to the invention may advantageously be enveloped in a layer of thermally-insulating material, not shown.

Naturally, in order to satisfy contingent and specific requirements, a person skilled in the art may apply to the mould 1 for moulding self-ventilated braking bands 20 from composite material according to the present invention many modifications and variations all of which, however, are included within the scope of protection of the invention as defined by the appended claims.

What is claimed is:

1. A mould for moulding braking bands of composite material, with ventilation ducts, the mould comprising:
   a. a substantially cylindrical housing comprising an inner edge and an outer edge; and having two half-moulds, each half-mould having an impression surface, the impression surfaces facing one another, lying substantially perpendicular to an axis of symmetry; at least one of the half-moulds being slidably movable by means of respective principal actuating means along the axis of symmetry towards the other half-mould for producing a predetermined pressure suitable for the moulding of the braking band,
   b. an inner, substantially cylindrical wall having an inner edge and an outer edge;

c. wherein said housing and inner wall are concentric with one another; and together with the two half-moulds, said housing and inner wall defining a moulding cavity without apertures during producing of said predetermined pressure in order to avoid addition of said composite material during movement of the two half-moulds and while the two half-moulds are closed to form said closed cavity;

d. one or more pin elements which can form the ventilation ducts and which can be transferred by secondary actuating means from a rest position to a working position and from the working position to the rest position, respectively, in which the pin elements do not interfere with the moulding cavity in the rest position, and the pin elements intersect the moulding cavity in the working position, and when the pin elements are in the work position, they lie substantially in a plane perpendicular to the axis of symmetry, halfway between the impression surface of the two half-moulds;

e. wherein said pin elements extend through the inner and outer edge of the housing; through the moulding cavity; and through the inner and outer edge of the inner wall when they are in the work position; and said pins do not extend through the moulding cavity or the inner or outer edge of the inner wall when they are in the rest position.

2. A mould according to claim 1 in which the pin elements are associated with the secondary actuating means.

3. A mould according to claim 2 in which the pin elements have respective rear ends and respective front ends which are tapered relative to the rear ends to facilitate the insertion of the pin elements forwards into the moulding cavity by their front ends during their transfer from the rest position to the working position and to facilitate the extraction of the pin elements from the moulded braking band during their transfer from the working position to the rest position.

4. A mould according to claim 3 in which the impression surfaces of the half-moulds have a substantially annular shape with an outer edge and an inner edge and the containment means comprise a substantially cylindrical outer wall and a substantially cylindrical inner wall, the outer and inner walls extending about the axis of symmetry and being associated with the outer edges and with the inner edges of the impression surfaces, respectively.

5. A mould according to claim 1 in which the containment means have through-holes suitable for constituting inlets and outlets for the pin elements during their transfer from the rest position to the working position and from the working position to the rest position, respectively.

6. A mould according to claim 1 in which the containment means are associated with the pin elements and are moved together therewith, defining the moulding cavity only when the pin elements are in the working position.

7. A mould according to claim 1 in which one or more containment means are integral with the pin elements and are moved together therewith, defining the moulding cavity only when the pin elements are in the working position.

8. A mould according to claim 1 in which, in the working position, the front end of a first pin element has a tapered, prismatic, final portion which is fitted in a respective prismatic cavity formed in the front end of a second pin element.

9. A mould according to claim 8 in which the prismatic, final portion is fitted only partially in the prismatic cavity, forming a ventilation duct with a peripheral projection.

10. A mould according to claim 1 in which, in the working position, the pin elements are inserted in the moulding cavity, extending from the outer wall to the inner wall and are distributed at substantially regular intervals around the moulding cavity.

11. A mould according to claim 10 in which the pin elements are substantially straight and are arranged radially relative to the axis of symmetry, forming substantially straight and radial ventilation ducts in the braking band.

12. A mould according to claim 10 in which the pin elements extend along substantially straight axes which are inclined to radial directions, with respect to the axis of symmetry, forming, in the braking band, substantially straight ventilation ducts which are inclined to radial directions, with respect to the axis of symmetry.

13. A mould according to claim 10 in which the pin elements have a substantially arcuate shape, forming arcuate ventilation ducts in the braking band.

14. A mould according to claim 9 in which the pin elements have cross-sections which are tapered from the outer wall towards the inner wall so as to form ventilation ducts which are tapered from the outer boundary of the braking band towards its inner boundary.

15. A mould according to claim 14 in which the pin elements have cross-sections which are tapered from the outer wall towards the inner wall so as to form, in the braking band, connecting walls having substantially uniform cross-sections.

16. A mould according to claim 1 in which the pin elements have a substantially circular shape in cross-section.

17. A mould according to claim 1 in which the pin elements have a substantially oval shape in cross-section.

18. A mould according to claim 1 in which the pin elements have a substantially polygonal shape in cross-section.

19. A mould according to claim 1 in which the secondary actuating means comprise one or more hydraulic piston/cylinder units.

20. A mould according to claim 1 in which the secondary actuating means comprise one or more pneumatic piston/cylinder units.

21. A mould according to claim 1 in which the secondary actuating means comprise linear motors.

22. A mould according to claim 1 in which the secondary actuating means comprise geared transmissions.

23. A mould according to claim 1 in which the principal actuating means comprise one or more hydraulic piston/cylinder units.

24. A mould according to claim 1 in which the principal actuating means comprise one or more pneumatic piston/cylinder units.

25. A mould according to claim 1 in which the principal actuating means comprise a linear motor.

26. A mould according to claim 1, made of aluminium or aluminium alloy.

27. A mould according to claim 1 comprising heating means.

28. A mould according to claim 27 in which the heating means comprise electrical resistors.

29. A mould according to claim 1, enveloped in a layer of thermally-insulating material.

30. A mould according to claim 1 in which, in the working position, the front ends of at least two of the pin elements meet inside the moulding cavity forming, in the braking band, ventilation ducts the outlets of which are enlarged in comparison with their inner portions.

31. The mould according to claim 1 wherein the housing has two circular openings each having a diameter.

32. The mould according to claim 31 wherein the two half-moulds comprise an operating rod having a diameter and a plate, wherein the diameter of the operating rod is less than the diameters of the circular openings.

33. A mould according to claim 1 wherein the inner wall is positioned in a recess formed in between the moulds, and held in position by a support means.

34. A mould according to claim 1, wherein four or more pins elements are arranged in a radial pattern.

35. The mould according to claim 34 wherein the two half-moulds comprise an operating rod having a diameter and a plate, wherein the diameter of the operating rod is less than the diameters of the circular openings.

36. A method of producing a braking band of composite material, with ventilation ducts, comprising the following steps:
providing a substantially cylindrical housing comprising an inner edge and an outer edge and having two half-moulds, each half-mould having an impression surface, the impression surfaces facing one another, lying substantially perpendicular to an axis of symmetry, at least one of the half-moulds being slidably movable by means of respective principal actuating means along an axis of symmetry towards the other half-mould for producing a predetermined pressure suitable for the moulding of the braking band;
providing an inner, substantially cylindrical wall having an inner edge and an outer edge; wherein said housing and inner wall are concentric with one another;
positioning the two half-moulds, housing, and inner wall so that they define a moulding cavity without apertures during producing of said predetermined pressure in order to avoid addition of said composite material during movement of the two half moulds;
transferring the pin elements from a rest position to a working position; wherein said pin elements extend through the inner and outer edge of the housing; through the moulding cavity; and through the inner and outer edge of the inner wall when they are in the work position; and said pins do not extend through the moulding cavity or the inner or outer edge of the inner wall when they are in the rest position;
filling the interior of the moulding cavity of the mould with a mixture of composite material;
moulding the braking band around the pin elements by applying a predetermined pressure by slidably moving at least one of the half-moulds of said mould along the axis of symmetry towards the other half mould and by applying a predetermined temperature avoiding the addition of further material during the application of said predetermined pressure or while the mould is closed;
transferring the pin elements from the working position to the rest position, extracting them from the semi-finished braking band;
ejecting the braking band from the mould.

37. A method according to claim 36, further comprising the step of pyrolysis of the braking band.

38. A method according to claim 37, further comprising the step of silication of the braking band.

39. A method according to claim 38, further comprising one or more steps for the mechanical finishing of the outer surfaces of the braking band.

40. The mould according to claim 36 wherein the housing has two circular openings each having a diameter.

41. A mould according to claim 40 wherein the inner wall is positioned in a recess formed in between the moulds, and held in position by a support means.

42. A mould according to claim 36, wherein four or more pins elements are arranged in a radial pattern.

43. The mould according to claim 41 wherein the two half-moulds comprise an operating rod having a diameter and a plate, wherein the diameter of the operating rod is less than the diameters of the circular openings.

44. A mould according to claim 42 wherein the inner wall is positioned in a recess formed in between the moulds, and held in position by a support means.

45. A method of producing a braking band of composite material, with ventilation ducts, comprising the following steps:
providing a substantially cylindrical housing comprising an inner edge and an outer edge; and a mould having two half-moulds, each half-mould having an impression surface, the impression surfaces facing one another, lying substantially perpendicular to an axis of symmetry, at least one of the half-moulds being slidably movable by means of respective principal actuating means along an axis of symmetry towards the other half-mould for producing a predetermined pressure suitable for the moulding of the braking band;
providing an inner, substantially cylindrical wall having an inner edge and an outer edge; wherein said housing and inner wall are concentric with one another;
positioning the two half-moulds, housing, and inner wall so that they define a moulding cavity without apertures during producing of said predetermined pressure in order to avoid addition of said composite material during movement of the two half moulds;
depositing one or more layers of a mixture of composite material in the moulding cavity of the mould;
transferring the pin elements from a rest position to a working position; wherein said pin elements extend through the inner and outer edge of the housing; through the moulding cavity; and through the inner and outer edge of the inner wall when they are in the work position; and said pins do not extend through the moulding cavity or the inner or outer edge of the inner wall when they are in the rest position;
depositing one or more layers of a mixture of composite material in the moulding cavity of the mould;
moulding the braking band around the pin elements by applying a predetermined pressure by slidably moving at least one of the half-moulds of said mould along the axis of symmetry towards the other half mould and by applying a predetermined temperature avoiding the addition of further material during the application of said predetermined pressure or while the mould is closed;
transferring the pin elements from the working position to the rest position, extracting them from the semi-finished braking band;
ejecting the braking band from the mould.

46. The method of claim 45, wherein after the moulding cavity has been filled with a predetermined quantity of material, the mould is closed by a coupling of the two mould portions.

47. The method of claim 45 wherein the front ends of at least two of the pin elements meet inside the moulding cavity forming, in the braking band, ventilation ducts the outlets of which are enlarged in comparison with their inner portions.

48. The mould according to claim 45 wherein the housing has two circular openings each having a diameter.

49. A mould according to claim 45, wherein four or more pins elements are arranged in a radial pattern.

* * * * *